United States Patent
Liu et al.

(10) Patent No.: US 10,325,306 B2
(45) Date of Patent: *Jun. 18, 2019

(54) RECOMMENDING AN ITEM PAGE

(71) Applicant: eBay Inc., San Jose, CA (US)

(72) Inventors: Sijie Liu, Santa Clara, CA (US); Yang Liu, Santa Clara, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/027,214

(22) Filed: Jul. 3, 2018

(65) Prior Publication Data
US 2018/0330424 A1 Nov. 15, 2018

Related U.S. Application Data

(63) Continuation of application No. 14/254,306, filed on Apr. 16, 2014, now Pat. No. 10,037,559.

(60) Provisional application No. 61/881,677, filed on Sep. 24, 2013.

(51) Int. Cl.
*G06Q 30/00* (2012.01)
*G06Q 30/06* (2012.01)

(52) U.S. Cl.
CPC ................ *G06Q 30/0631* (2013.01)

(58) Field of Classification Search
CPC ..... G06Q 30/06; G06Q 50/01; G06F 17/3053
USPC ....................................................... 705/26.1
See application file for complete search history.

(56) References Cited

U.S. PATENT DOCUMENTS

| 10,037,559 | B2 | 7/2018 | Liu et al. |
| 2004/0128224 | A1* | 7/2004 | Dabney ................. G06Q 30/08 705/37 |
| 2007/0078833 | A1* | 4/2007 | Chea ................. G06F 17/30861 |
| 2010/0191582 | A1* | 7/2010 | Dicker ................. G06Q 30/02 705/14.51 |
| 2015/0088683 | A1 | 3/2015 | Liu et al. |

OTHER PUBLICATIONS

"U.S. Appl. No. 14/254,306, Non Final Office Action dated Jul. 11, 2017", 11 pgs.
"U.S. Appl. No. 14/254,306, Examiner Interview Summary dated Nov. 7, 2017", 3 pgs.

(Continued)

*Primary Examiner* — Brandy A Zukanovich
(74) *Attorney, Agent, or Firm* — Schwegman Lundberg & Woessner, P.A.

(57) ABSTRACT

The present disclosure addresses systems and methods to facilitate recommending an item page. The system may receive a reference to the item from a first device that corresponds to a first person. The system may generate an item page that refers to the item. The generating of the item page may be based on the received reference to the item. The system may detect that a quantity of received comments directed to the item exceeds a threshold amount. The received comments may be received by the system from a plurality of devices that correspond to second persons other than a seller of the item. An address of the generated item page may be sent to a second device that corresponds to a seller of the item. The sending of the address may be in response to the system detecting that the quantity of the received comments exceeds the threshold amount.

20 Claims, 8 Drawing Sheets

(56) References Cited

OTHER PUBLICATIONS

"U.S. Appl. No. 14/254,306, Examiner Interview Summary dated Dec. 1, 2017", 3 pgs.
"U.S. Appl. No. 14/254,306, Response filed Jan. 2, 2018 to Non Final Office Action dated Jul. 11, 2017", 13 pgs.
"U.S. Appl. No. 14/254,306, Notice of Allowance dated Mar. 27, 2018", 8 pgs.
Lawrence, R D, "Personalization of Supermarket Product Recommendations", Data Mining and Knowledge Discovery, (Jan. 2001), 2 pages.

\* cited by examiner

FIG. 8

RECOMMENDING AN ITEM PAGE

RELATED APPLICATIONS

This application is a continuation application of, and claims the priority benefit of, U.S. patent application Ser. No. 14/254,306, filed Apr. 16, 2014, and entitled "RECOMMENDING AN ITEM PAGE," which claims the priority benefit of U.S. Provisional Patent Application No. 61/881,677, filed Sep. 24, 2013. The contents of these prior applications are considered part of this application, and are both hereby incorporated by reference in their entirety.

TECHNICAL FIELD

The subject matter disclosed herein generally relates to the processing of data. Specifically, the present disclosure addresses systems and methods to facilitate recommending an item page.

BACKGROUND

A user may send an item reference from a device to a network-based server. The device may be a mobile device with internet capabilities. The network-based server may generate an item page based on the item reference received from the device. The item page may be hosted online by the network-based server to be viewed by further users that are subscribed to a network-based service provided by the network-based server. Each of the further users may access the network-based service using a further device.

BRIEF DESCRIPTION OF THE DRAWINGS

Some embodiments are illustrated by way of example and not limitation in the figures of the accompanying drawings.

DETAILED DESCRIPTION

Example methods and systems are directed to recommending an item page. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A user may discover an item available for sale that is of interest to the user. The user may provide a network-based server with a reference to the item available for sale. The reference to the item may include a picture of the item, an identifier of the item, a description of the item, a location of the item, or any suitable combination thereof. Moreover, the user may discover the item while shopping at various locations including a physical retail store, a garage sale, or an outdoor farmer's market. The network-based server may receive the reference to the item and generate an item page based on the reference to the item. Thereafter, further users may leave comments on the item page, with the comments being directed to the item. Based on the amount of comments received, the server may then recommend the item page to a seller of the item available for sale. In some example embodiments, the network-based server may send an address of an item page to a device corresponding to a seller of the item.

Figure 1:
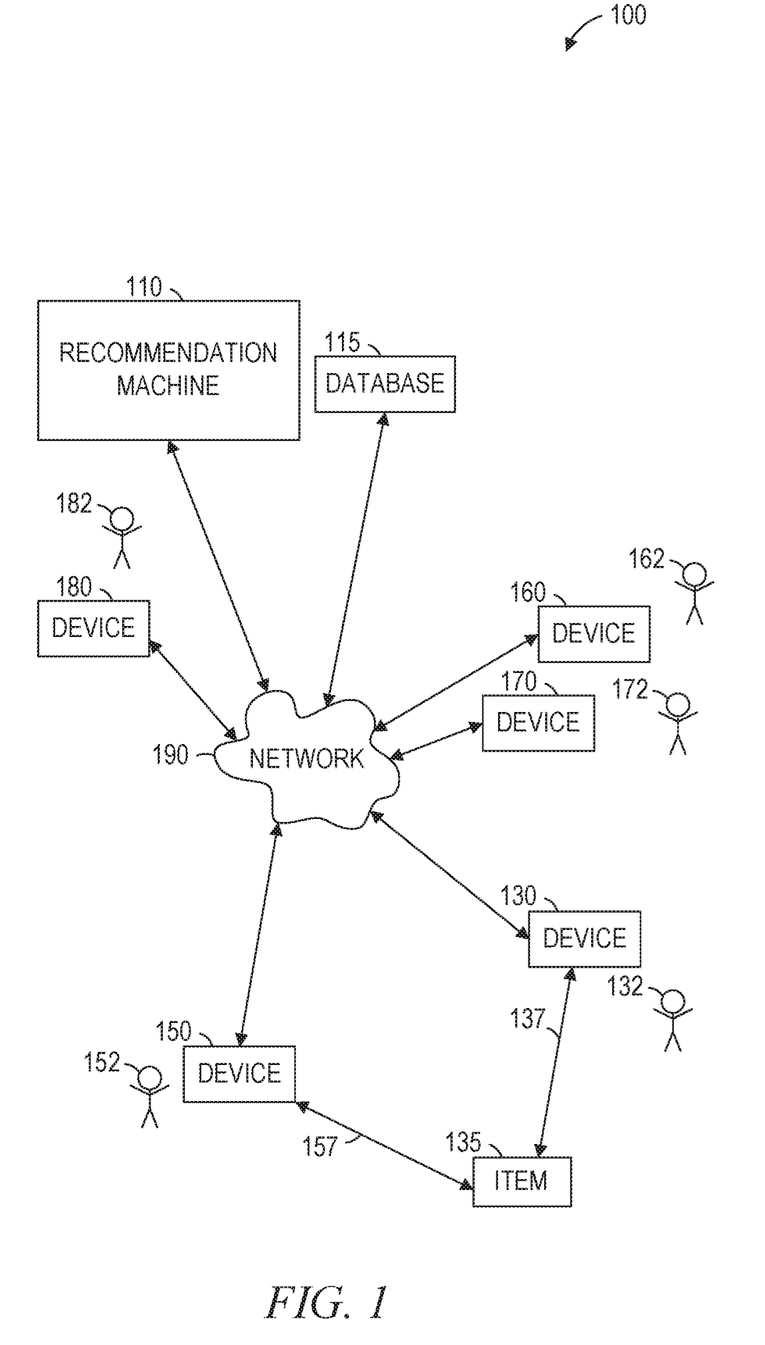
FIG. 1 is a network diagram illustrating a network environment suitable for recommending an item page, according to some example embodiments.

FIG. 1 is a network diagram illustrating a network environment 100 suitable for sending an address of an item page to a device corresponding to a seller of the item, according to some example embodiments. The network environment 100 includes a recommendation machine 110, a database 115, and devices 130, 150, 160, 170, and 180 all communicatively coupled to each other via a network 190. The recommendation machine 110 and the devices 130, 150, 160, 170, and 180 may each be implemented in a computer system, in whole or in part, as described below with respect to FIG. 8.

Also shown in FIG. 1 are users 132, 152, 162, 172, and 182. Each of the users 132, 152, 162, 172, and 182 may be a human user (e.g., a person), a machine user (e.g., a computer configured by a software program to interact with the device 130), or any suitable combination thereof (e.g., a human assisted by a machine or a machine supervised by a human). The user 132 is not part of the network environment 100, but is associated with the device 130 and may be a user of the device 130. For example, the device 130 may be a desktop computer, a vehicle computer, a tablet computer, a navigational device, a portable media device, or a smart phone belonging to the user 132. Likewise, the user 152 (e.g., a person) is not part of the network environment 100, but is associated with the device 150. As an example, the device 150 may be a desktop computer, a vehicle computer, a tablet computer, a navigational device, a portable media device, or a smart phone belonging to the user 152. Moreover, users 162, 172, and 182 are not part of the network environment 100, but are each separately associated with devices 160, 170, and 180 respectively and may be users of the devices 160, 170, and 180. For example, the device 160 may be a desktop computer, a vehicle computer, a tablet computer, a navigational device, a portable media device, or a smart phone belonging to the user 162. As another example, the device 170 may be a desktop computer, a vehicle computer, a tablet computer, a navigational device, a portable media device, or a smart phone belonging to the user 172. As another example, the device 180 may be a desktop computer, a vehicle computer, a tablet computer, a navigational device, a portable media device, or a smart phone belonging to the user 182.

The user 132 may use the device 130 to provide a reference to an item 135 to the recommendation machine 110. The recommendation machine 110 may receive the reference to the item 135 and generate an item page based on the reference to the item 135. The item page may be displayed on the devices 160 and 170 associated with the users 162 and 172. Thereafter, the users 162 and 172 may each use the devices 160 and 170 separately to leave comments on the item page with the comments being directed to the item 135. Based on the amount of comments received, the recommendation machine 110 may then recommend the item page to the user 152. The user 152 may be a seller of the item 135 available for sale. The device 130 may be separated from the item 135 by a distance 137. Moreover, the device 150 may be separated from the item 135 by a distance 157.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 8. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 190 may be any network that enables communication between or among machines, databases, and devices (e.g., the recommendation machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., WiFi network or WiMax network), or any suitable combination thereof. Any one or more portions of the network 190 may communicate information via a transmission medium. As used herein, "transmission medium" shall be taken to include any intangible medium that is capable of storing, encoding, or carrying instructions for execution by a machine, and includes digital or analog communication signals or other intangible media to facilitate communication of such software.

Figure 2:
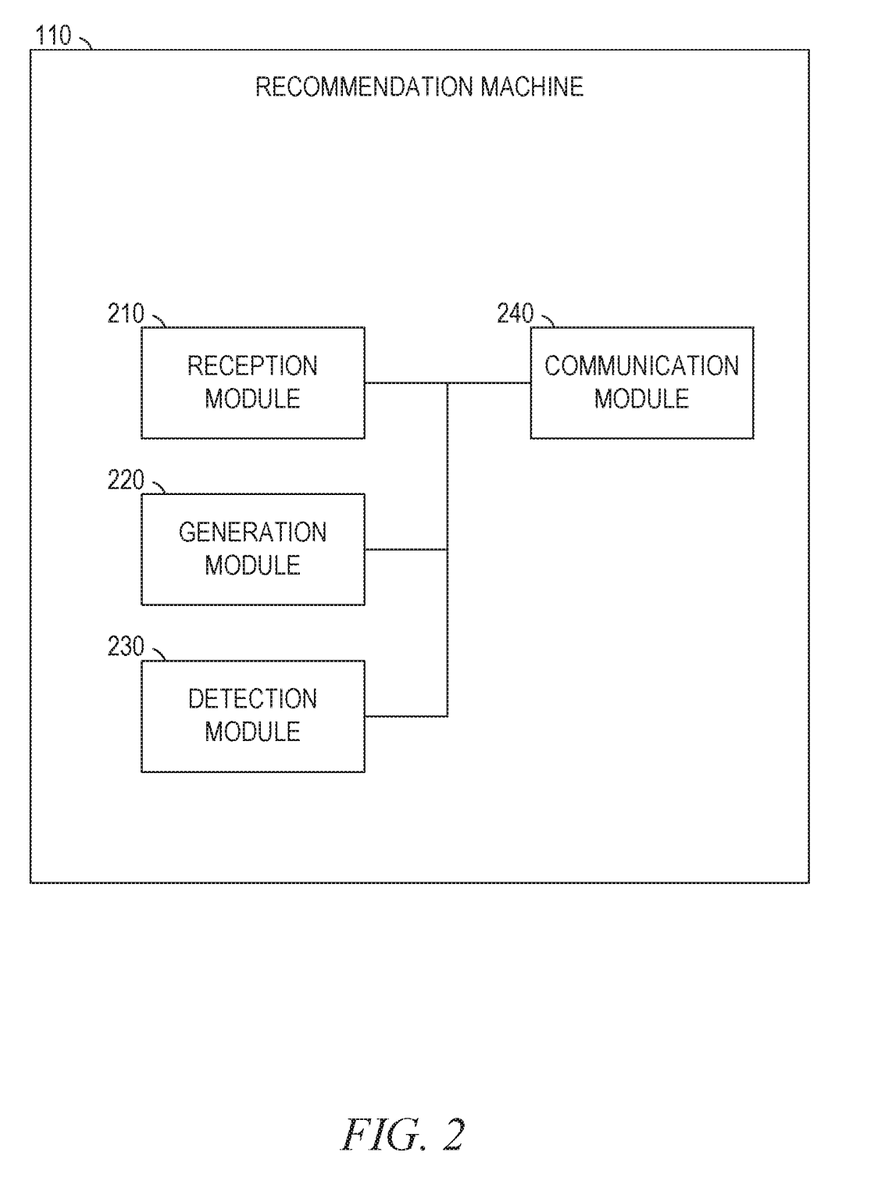
FIG. 2 is a block diagram illustrating components of a recommendation machine, according to some example embodiments.

FIG. 2 is a block diagram illustrating components of the recommendation machine 110, according to some example embodiments. The recommendation machine 110 is shown as including a reception module 210, a generation module 220, a detection module 230, and a communication module 240, all configured to communicate with each other (e.g., via a bus, shared memory, or a switch). Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

In various example embodiments, the reception module 210 is configured to receive a reference to an item (e.g., item 135) from a first device (e.g., device 130) that corresponds to a first person (e.g., user 132). The item may be available for sale by a seller (e.g., user 152) of the item (e.g., item 135). Moreover, the first device (e.g., device 130) may be within a threshold distance (e.g., distance 137) from the item (e.g., item 135). The threshold distance may encompass a set of distances included within a certain radius around the location of the item (e.g., item 135). For instance, the first device may be within the certain radius around the location of the item (e.g., item 135) when providing the reference to the item (e.g., item 135) to the reception module 210. For example, the first person may be browsing the item (e.g., item 135) at various locations including a physical retail store, a garage sale, or an outdoor farmer's market.

Moreover, the first person (e.g., user 132) may use the first device (e.g., device 130) to upload the reference to the item (e.g., item 135) to the recommendation machine 110 (e.g., for reception by the reception module 210). As further explained below, the reference to the item (e.g., item 135) may include any information that identifies the item (e.g., an image of the item, an identifier of the item, a name of the item, a description of the item, a location of the item, or any suitable combination thereof). In various example embodiments, the location of the item (e.g., item 135) corresponds to location data obtained using a Global Positioning System (GPS) receiver on the first device (e.g., GPS location coordinates, address, or any suitable combination thereof).

In various example embodiments, the reception module 210 is further configured to receive, from the first device (e.g., device 130), a notification that the item (e.g., item 135) has been purchased by the first person (e.g., user 132) via the first device (e.g., device 130). The notification may be triggered and sent from the first device (e.g., device 130) upon an operation by the first person to purchase the item (e.g., item 135). For instance, an application installed on the first device (e.g., device 130) may enable the first person to make a purchase of the item (e.g., item 135) using the first device (e.g., device 130). In some instances, the notification may also be triggered when the first person provides user credentials to purchase the item (e.g., item 135) via the first device (e.g., device 130).

In various example embodiments, the reception module 210 is further configured to receive comments directed to the item (e.g., item 135) from a plurality of devices (e.g., devices 160 and 170) that correspond to second persons (e.g., users 162 and 172) other than the seller (e.g., user 152) of the item (e.g., item 135). In some instances, at least one of the received comments is received from the first device (e.g., device 130), wherein the second persons (e.g., users 162 and 172) include the first person (e.g., user 132). As further explained below, the comments directed to the item (e.g., item 135) may be in the form of feedback that indicates either a positive or negative experience regarding the item (e.g., item 135). For instance, the comments directed to the item may be comments that refer to the item (e.g., item 135) or comments that address the item (e.g., item 135).

In various example embodiments, the reception module 210 is further configured to receive an image that depicts the item (e.g., item 135), and such an image may be received from the first device (e.g., device 130). In various example embodiments, the reception module 210 is further configured to receive an identifier of the item (e.g., item 135) from the first device (e.g., device 130). In various example embodiments, the reception module 210 is further configured to receive a location of the item (e.g., item 135), and the location of the item may be included as part of the reference to the item.

In various example embodiments, the reception module 210 is further configured to receive item preferences of a third user (e.g., user 182) from a third device (e.g., device 180) that corresponds to the third user. The item preferences may indicate item characteristics of interest to the third user.

Moreover, the reception module 210 may be further configured to retrieve item characteristics of the item (e.g., item 135) from a database (e.g., database 115) based on the reference to the item. The item characteristics of the item may include features that distinguish the item or may include the reference to the item.

In various example embodiments, the generation module 220 is configured to generate an item page that refers to the item (e.g., item 135) based on the received reference to the item (e.g., item 135). The generated item page may include a description of the item as well as any other information with regards to the item (e.g., item 135). In some instances, the generation module 220 may generate the item page based on the image that depicts the item (e.g., item 135) received at the reception module 210. For instance, the generation module 220 may generate an item page that displays the image that depicts the item (e.g., item 135) within a portion of the generated item page. In some instances, the generation module 220 may generate the item page based on the identifier of the item (e.g., item 135) received at the reception module 210. For instance, the generation module 220 may generate an item page that displays the identifier of the item (e.g., item 135) within a portion of the generated item page. In various example embodiments, the generation module 220 is further configured to display the received comments directed to the item (e.g., item 135) as part of the item page. In other words, the received comments directed to the item (e.g., item 135) may be displayed within a portion of the item page. In some instances, the generated item page may include controls operable by a viewer to leave comments directed to the item (e.g., item 135). Moreover, the controls may include a button to indicate a preference with regards to the item (e.g., item 135).

In various example embodiments, the detection module 230 is configured to detect that a quantity of received comments directed to the item (e.g., item 135) exceeds a threshold amount. The received comments may be received from the plurality of devices (e.g., devices 160 and 170) that correspond to the second persons (e.g., users 162 and 172). Moreover, the second persons (e.g., users 162 and 172) may be persons other than the seller of the item (e.g., item 135). The received comments may include positive comments and negative comments. The positive comments may be indicative of an increased amount of interest in the item (e.g., item 135) and the negative comments may be indicative of a decreased amount of interest in the item (e.g., item 135). The detection module 230 may be further configured to determine that the positive comments outnumber the negative comments (e.g., positive ratings outnumber negative ratings; a majority of positive comments exist among the received comments). The positive comments may include a recommendation of the item (e.g., item 135), a description of a positive interaction with the item (e.g., item 135), a positive rating for the item (e.g., item 135), or any suitable combination thereof. In various example embodiments, the generated item page may include a comments section where the comments directed to the item (e.g., item 135) are displayed. In various example embodiments, the detection module 230 is further configured to detect that the second device (e.g., device 150) that corresponds to the seller is within a second threshold distance (e.g., distance 157) from the location of the item (e.g., item 135). The second threshold distance may encompass a set of distances included within a certain radius around the location of the item (e.g., item 135). In some instances, at least one of the received comments is received from a retail device located within the retail store in which the item (e.g., item 135) is available for sale. For instance, the retail device is made available by a merchant of the retail store for customers of the retail store to use and reference. Customers may use the retail device to comment on the item (e.g., item 135) available for sale within the retail store. Moreover, the retail device may be included in the plurality of devices (e.g., devices 160 and 170) that correspond to the second persons (e.g., users 162 and 172). In various example embodiments, the detection module 230 is further configured to determine that the item preferences of the third user (e.g., user 182) match with the retrieved item characteristics of the item (e.g., item 135).

In various example embodiments, the communication module 240 is configured to send an address of the generated item page to a second device (e.g., device 150) that corresponds to the seller of the item (e.g., item 135). The address of the generated item page may be a web address of the generated item page, a link to cause the generated item page to be displayed, or any suitable combination thereof. The communication module 240 may be further configured to send the address in response to the detection module 230 detecting that the quantity of the received comments directed to the item (e.g., item 135) exceeds the threshold amount. In various example embodiments, the communication module 240 is further configured to send the received comments and the generated item page to the second device (e.g., device 150) that corresponds to the seller of the item (e.g., item 135), the comments being displayed with the generated item page in the second device (e.g., device 150). In some instances, the comments directed to the item (e.g., item 135) may be displayed within a portion of the generated item page. The communication module 240 may be further configured to send the address of the generated item page to the second device (e.g., device 150) in response to the reception module 210 receiving the notification from the first device (e.g., device 130). As stated previously, the notification may indicate that the item (e.g., item 135) has been purchased by the first person via the first device (e.g., device 130). In various example embodiments, the communication module 240 is further configured to send the address of the generated item page in response to the detection module 230 determining that the positive comments outnumber the negative comments. In various example embodiments, the communication module 240 is further configured to send the address of the generated item page to the second device (e.g., device 150) based on the detection module 230 detecting that the second device (e.g., device 150) is within the second threshold distance from the location of the item (e.g., item 135). In various example embodiments, the communication module 240 is further configured to send the address of the generated item page to the third device (e.g., device 180) that corresponds to the third user (e.g., user 182). The address of the generated item page may be a web address of the generated item page, a link to cause the generated item page to be displayed, or any suitable combination thereof.

Figure 3:
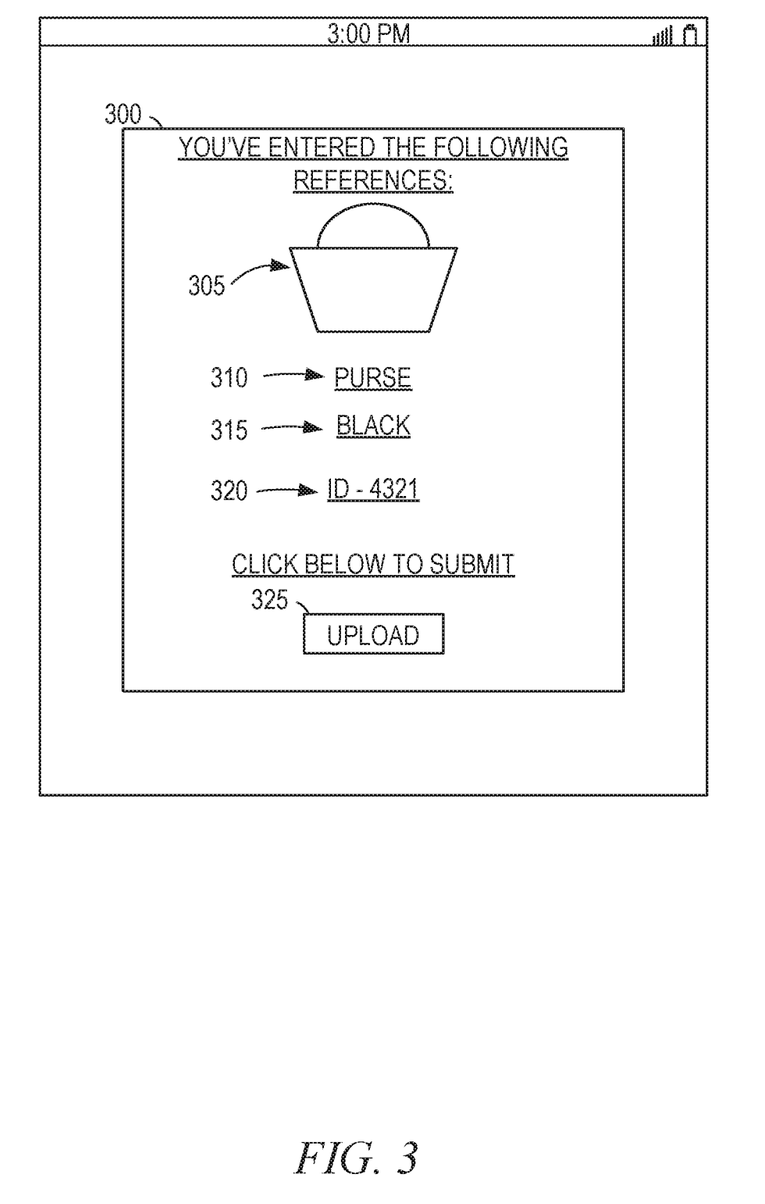
FIG. 3 is an example user interface of an upload page that includes item references to an item, according to some example embodiments.

FIG. 3 is an example user interface of an upload page 300 that includes the item references 305, 310, 315, 320 to an item (e.g., item 135), according to some example embodiments. The upload page 300 may include item references 305, 310, 315, and 320, and an upload button 325. The item references 305, 310, 315, and 320 may each be a reference to the item (e.g., item 135) that is displayed within the upload page 300. The upload page 300 may be displayed on the first device (e.g., device 130) that corresponds to the first person (e.g., user 132). In various example embodiments, the generation module 220 may generate the upload page 300 and the communication module 240 may cause the upload page 300 to be displayed in the first device (e.g., device 130). Moreover, the upload page 300 may be usable by the first person to communicate the item references 305, 310, 315, and 320 to the reception module 210. Each of the item references 305, 310, 315, and 320 may be entered by the first person corresponding to the first device (e.g., device 130). For instance, the item reference 305 may be an image of the item (e.g., item 135) that is captured by a camera of the first device (e.g., device 130). The item reference 310 may be a name of the item (e.g., item 135). The item reference 315 may be a color of the item (e.g., item 135). Lastly, the item reference 320 may be an identification number of the item (e.g., item 135). The upload page 300 may display each of the item references 305, 310, 315, and 320 as being entered by the first person (e.g., user 132). Further, each of the item references 305, 310, 315, and 320 may be communicated from the first device (e.g., device 130) to the reception module 210 upon operation of the upload button 325.

Figure 4:
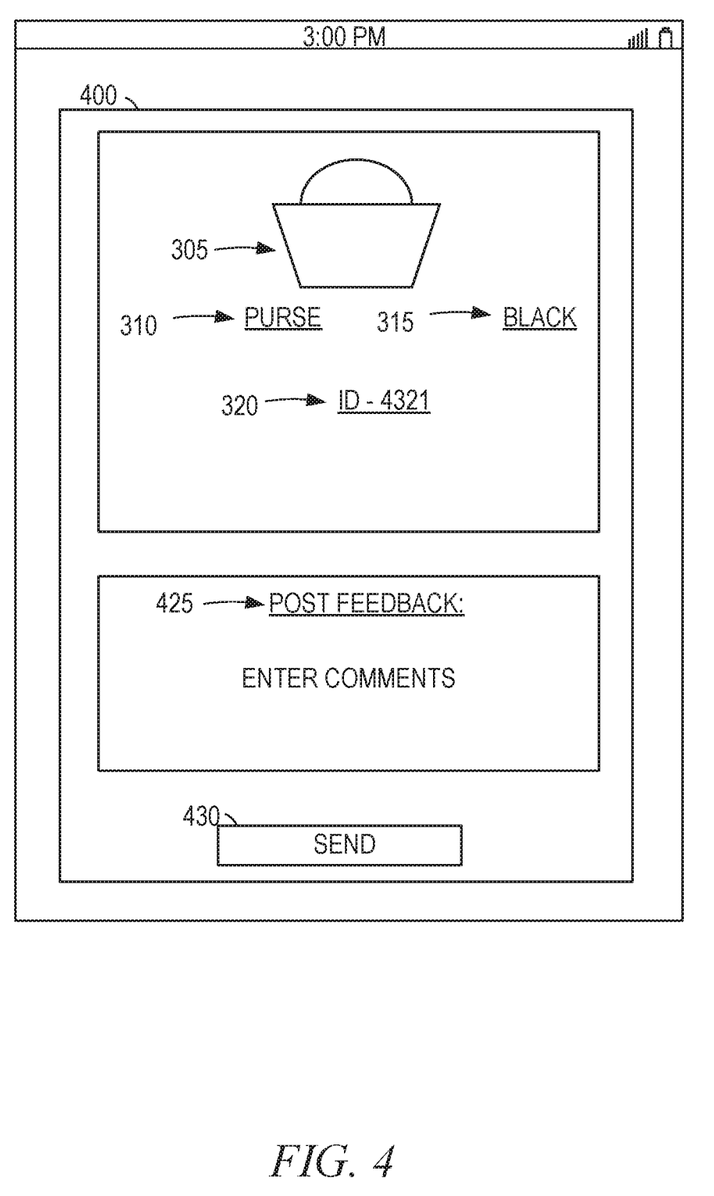
FIG. 4 is an example user interface of an item page that includes item references to an item, according to some example embodiments.

FIG. 4 is an example user interface of an item page 400 that includes the item references 305, 310, 315, and 320 to an item (e.g., item 135), according to some example embodiments. The item page 400 may be generated by the generation module 220 as a result of the first person communicating the item references 305, 310, 315, and 320 of FIG. 3. Moreover, the item page 400 may include each of the communicated item references 305, 310, 315, and 320 of FIG. 3. In various example embodiments, the item page 400 may be displayed on a plurality of devices (e.g., devices 160 and 170) that correspond to persons other than the seller (e.g., user 152) of the item (e.g., item 135) referred to by the item page 400. The item page 400 may also include a feedback section 425 where users can post comments directed to the item (e.g., item 135). Lastly, the item page 400 may include a control 430 that is operable to send the comments to the recommendation machine 110. Alternatively, the control 430 may be operable to post the comments directly onto a portion of the generated item page 400. Each of the persons other than the seller (e.g., user 152) of the item (e.g., item 135) may interact with the item page 400 to post comments directed to the item (e.g., item 135).

Figure 5:
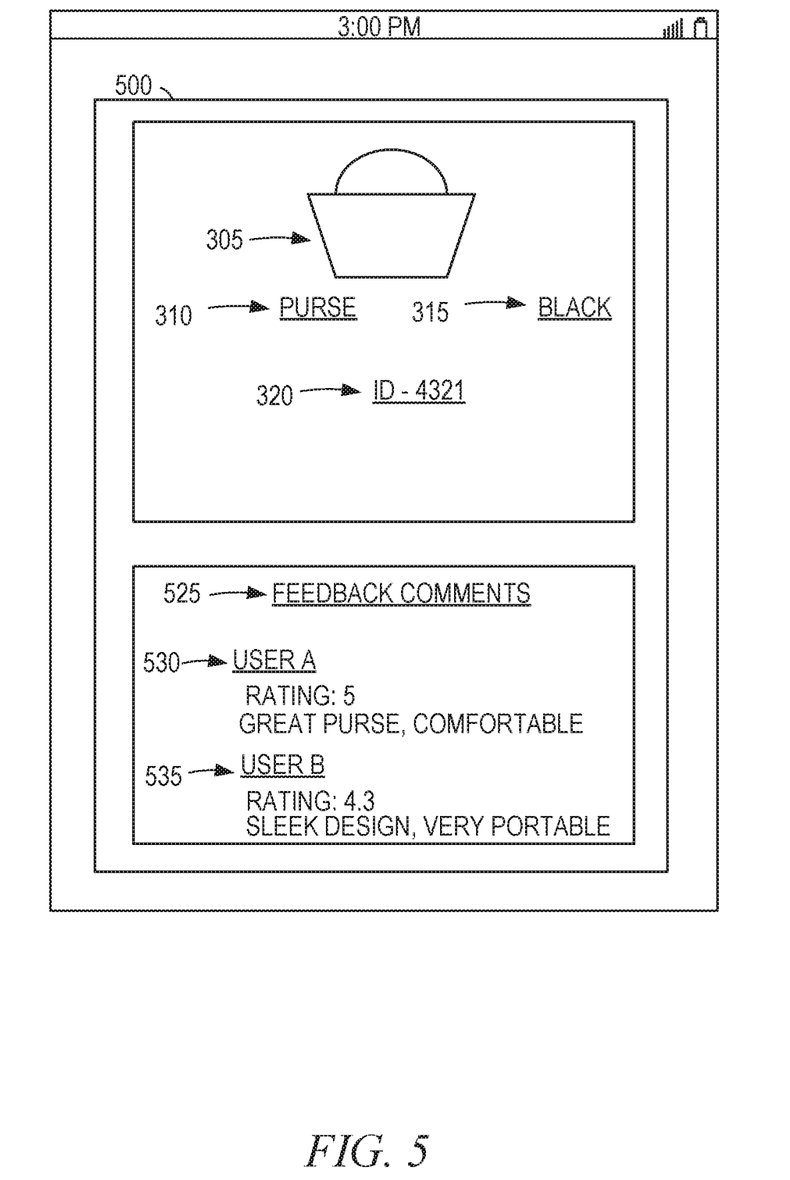
FIG. 5 is an example user interface of an item page that includes item references to an item and comments directed to the item, according to some example embodiments.

FIG. 5 is an example user interface of an item page 500 that includes the item references 305, 310, 315, and 320 to an item (e.g., item 135) and comments directed to the item (e.g., item 135), according to some example embodiments. The item page 500 may include each of the submitted item references 305, 310, 315, and 320 of FIG. 3. Moreover, the item page 500 may be displayed on a second device (e.g., device 150) that corresponds to a seller (e.g., user 152) of the item (e.g., item 135) referred to in the item page 500. The item page 500 may also include a comments section 525 that displays comments directed to the item (e.g., item 135). The comments may be received from persons other than the seller (e.g., user 152) of the item (e.g., item 135) referred to by the item page 500. For instance, comments received from users 530 and user 535 may be displayed within the comments section 525 of the item page 500. The users 530 and 535 may each have separately posted comments in the comments section 425 of the item page 400 of FIG. 4. Moreover, the users 530 and 535 may correspond to the users 162 and 172 of FIG. 1.

Figure 6:
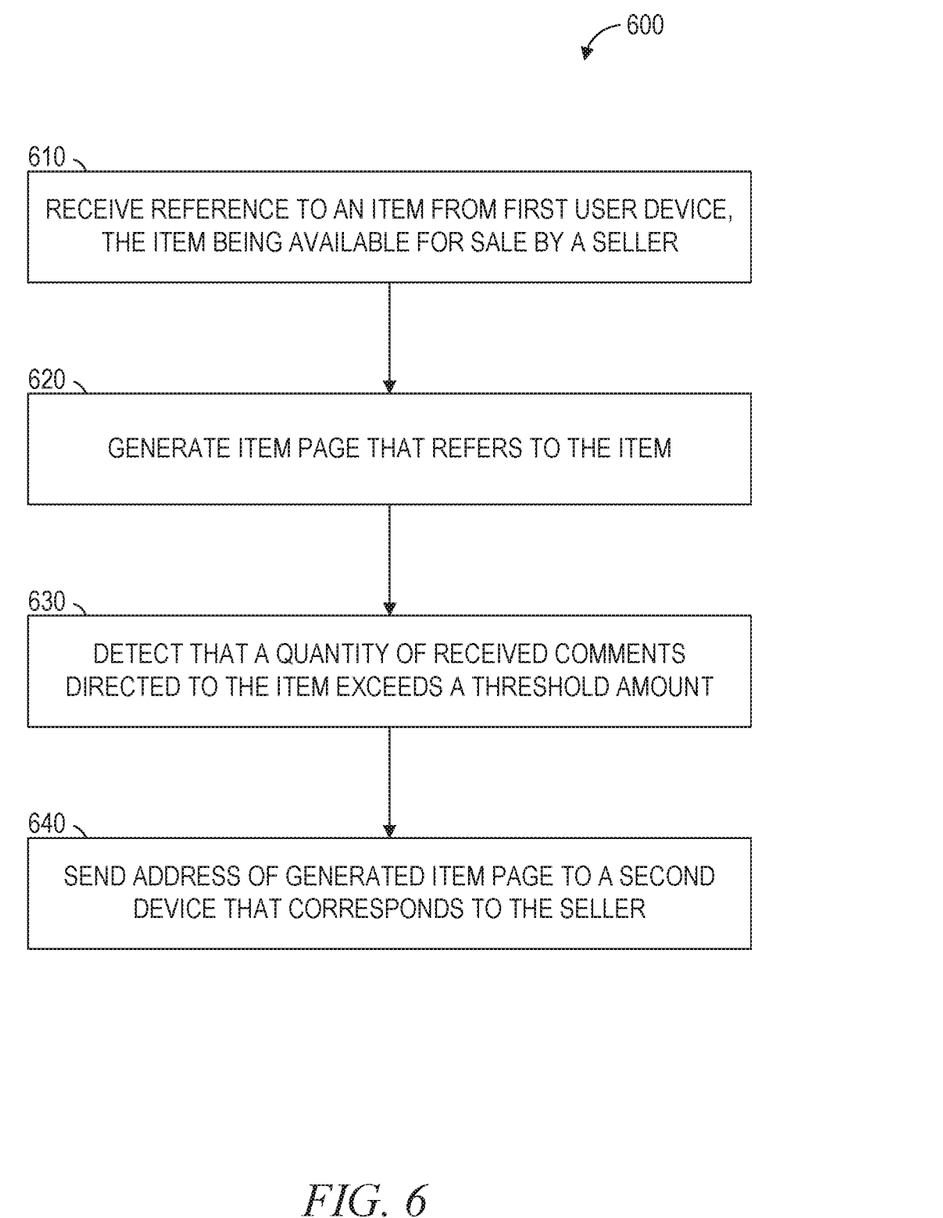
FIGS. 6 and 7 are flowcharts illustrating operations in a method of recommending an item page, according to some example embodiments.
Figure 7:
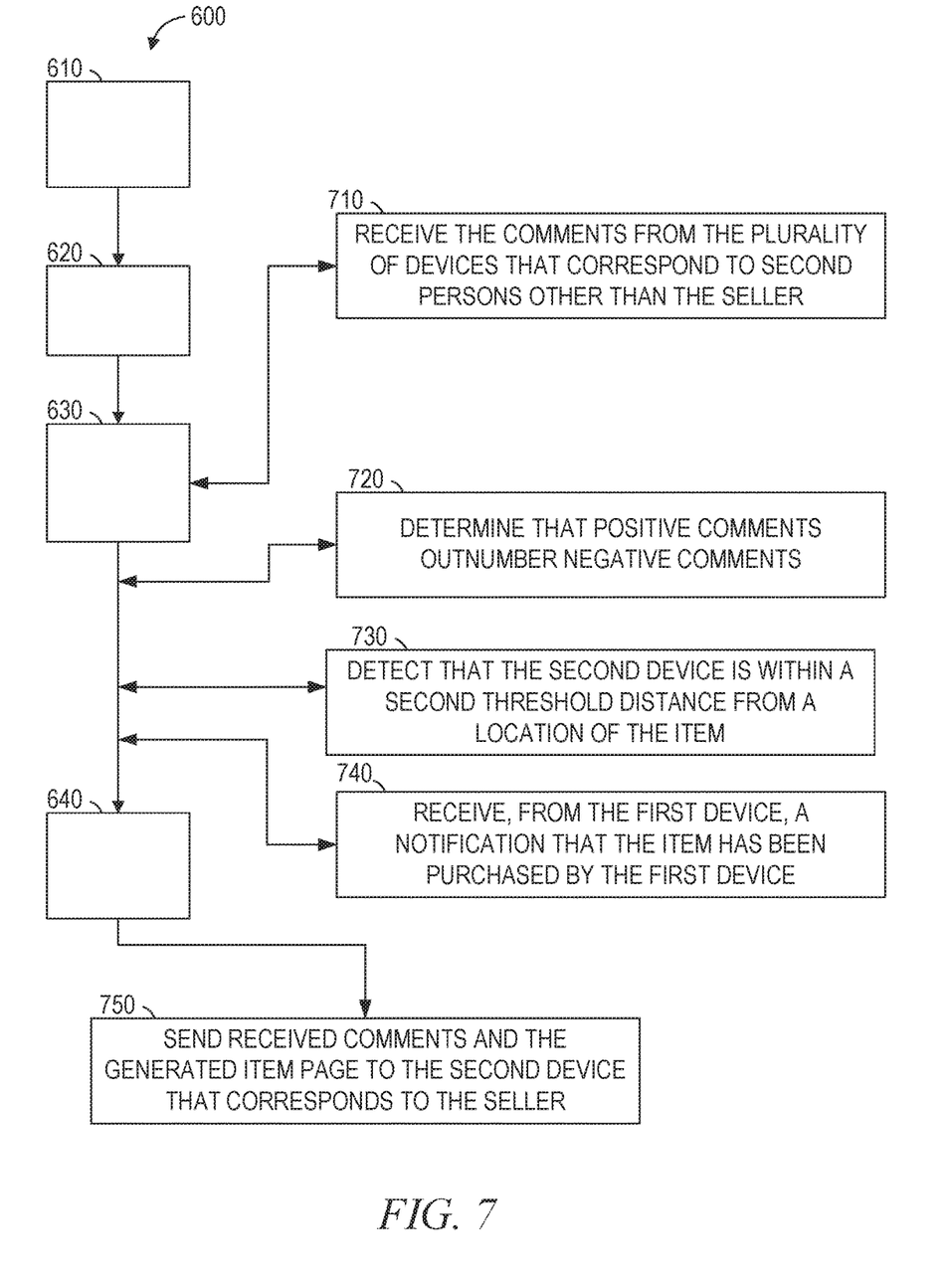

FIGS. 6 and 7 are flowcharts illustrating operations in a method of recommending an item page, according to some example embodiments. Operations in the method 600 may be performed by the recommendation machine 110, using modules described above with respect to FIG. 2. As shown in FIG. 6, the method 600 includes operations 610, 620, 630, and 640.

At operation 610, the reception module 210 may receive a reference to an item (e.g., item 135) from a first device (e.g., device 130) that corresponds to a first person (e.g., user 132). The item (e.g., item 135) may be available for sale by a seller (e.g., user 152) of the item (e.g., item 135). Moreover, the first device (e.g., device 130) may be within a threshold distance (e.g., distance 137) from the item (e.g., item 135). The reference to the item (e.g., item 135) may include any information that identifies the item (e.g., an image, an identifier, a description of the item, a location of the item, or any suitable combination thereof).

At operation 620, the generation module 220 may generate an item page that refers to the item (e.g., item 135) based on the received reference to the item (e.g., item 135). The generated item page may include a description of the item (e.g., item 135) as well as any other information with regards to the item (e.g., item 135).

At operation 630, the detection module 230 may detect that a quantity of received comments directed to the item (e.g., item 135) exceeds a threshold amount. The received comments may be received from the plurality of devices (e.g., devices 160 and 170) that correspond to the second persons (e.g., users 162 and 172). Moreover, the second persons (e.g., users 162 and 172) may be persons other than the seller (e.g., user 152) of the item (e.g., item 135). The received comments may include positive comments and negative comments. The positive comments may be indicative of an increased amount of interest in the item (e.g., item 135) and the negative comments may be indicative of a decreased amount of interest in the item (e.g., item 135).

At operation 640, the communication module 240 may send the address of the generated item page to a second device (e.g., device 150) that corresponds to the seller (e.g., user 152) of the item (e.g., item 135). The address of the generated item page may be a web address of the generated item page, a link to cause the generated item page to be displayed, or any suitable combination thereof.

As shown in FIG. 7, the method 600 may include one or more of operations 710, 720, 730, 740, and 750. Operation 710 may be performed as part (e.g., a precursor task, a subroutine, or a portion) of operation 630. One or more of operations 720-740 may be performed at any point prior to operation 640. Operation 750 may be performed after operation 640.

At operation 710, the reception module 210 may receive comments from the plurality of devices (e.g., devices 160 and 170) that correspond to second persons (e.g., users 162 and 172) other than the seller (e.g., user 152).

At operation 720, the detection module 230 may determine that among the received comments, the positive comments outnumber the negative comments.

At operation 730, the detection module 230 may detect that the second device (e.g., device 150) that corresponds to the seller (e.g., user 152) is within a second threshold distance (e.g., distance 157) from the location of the item (e.g., item 135).

At operation 740, the reception module 210 may receive, from a first device (e.g., device 130), a notification that that the item (e.g., item 135) has been purchased by the first person (e.g., user 132) via the first device (e.g., device 130).

At operation 750, the communication module 240 may send the received comments and the generated item page to the second device (e.g., device 150) that corresponds to the seller (e.g., user 152) of the item (e.g., item 135), the comments being displayed with the generated item page in the second device (e.g., device 150).

Figure 8:
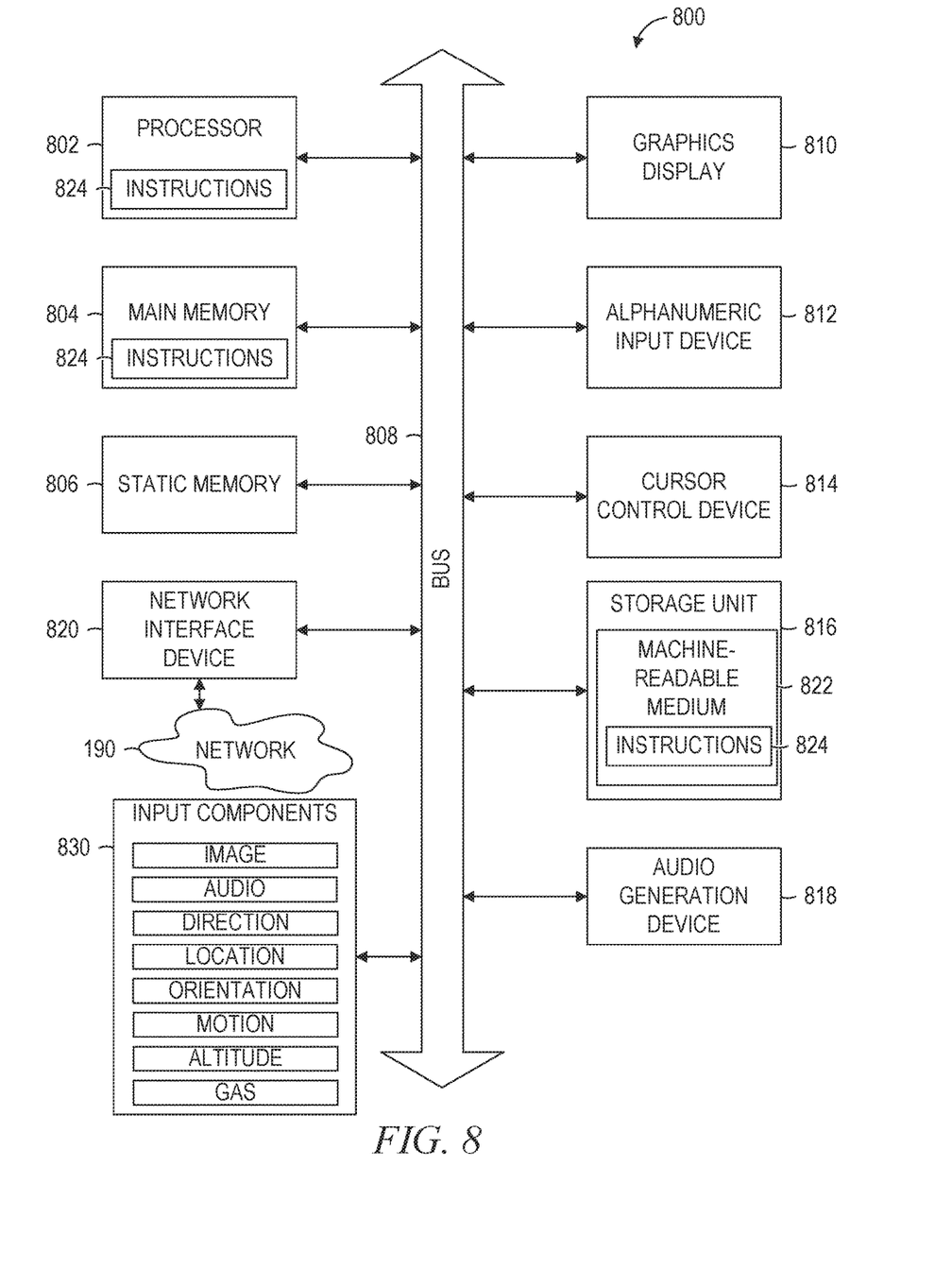
FIG. 8 is a block diagram illustrating components of a machine, according to some example embodiments, able to read instructions from a machine-readable medium and perform any one or more of the methodologies discussed herein.

FIG. 8 is a block diagram illustrating components of a machine 800, according to some example embodiments, able to read instructions 824 from a machine-readable medium 822 (e.g., a machine-readable storage medium, a computer-readable storage medium, or any suitable combination thereof) and perform any one or more of the methodologies discussed herein, in whole or in part. Specifically, FIG. 8 shows the machine 800 in the example form of a computer system within which the instructions 824 (e.g., software, a program, an application, an applet, an app, or other executable code) for causing the machine 800 to perform any one or more of the methodologies discussed herein may be executed, in whole or in part. In alternative embodiments, the machine 800 operates as a standalone device or may be connected (e.g., networked) to other machines. In a networked deployment, the machine 800 may operate in the capacity of a server machine or a client machine in a server-client network environment, or as a peer machine in a distributed (e.g., peer-to-peer) network environment. The machine 800 may be a server computer, a client computer, a personal computer (PC), a tablet computer, a laptop computer, a netbook, a cellular telephone, a smart phone, a set-top box (STB), a personal digital assistant (PDA), a web appliance, a network router, a network switch, a network bridge, or any machine capable of executing the instructions 824, sequentially or otherwise, that specify actions to be taken by that machine. Further, while only a single machine is illustrated, the term "machine" shall also be taken to include any collection of machines that individually or jointly execute the instructions 824 to perform all or part of any one or more of the methodologies discussed herein.

The machine 800 includes a processor 802 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 804, and a static memory 806, which are configured to communicate with each other via a bus 808. The processor 802 may contain microcircuits that are configurable, temporarily or permanently, by some or all of the instructions 824 such that the processor 802 is configurable to perform any one or more of the methodologies described herein, in whole or in part. For example, a set of one or more microcircuits of the processor 802 may be configurable to execute one or more modules (e.g., software modules) described herein.

The machine 800 may further include a graphics display 810 (e.g., a plasma display panel (PDP), a light emitting diode (LED) display, a liquid crystal display (LCD), a projector, a cathode ray tube (CRT), or any other display capable of displaying graphics or video). The machine 800 may also include an alphanumeric input device 812 (e.g., a keyboard or keypad), a cursor control device 814 (e.g., a mouse, a touchpad, a trackball, a joystick, a motion sensor, an eye tracking device, or other pointing instrument), a storage unit 816, an audio generation device 818 (e.g., a sound card, an amplifier, a speaker, a headphone jack, or any suitable combination thereof), and a network interface device 820.

The storage unit 816 includes the machine-readable medium 822 (e.g., a tangible and non-transitory machine-readable storage medium) on which are stored the instructions 824 embodying any one or more of the methodologies or functions described herein. The instructions 824 may also reside, completely or at least partially, within the main memory 804, within the processor 802 (e.g., within the processor's cache memory), or both, before or during execution thereof by the machine 800. Accordingly, the main memory 804 and the processor 802 may be considered machine-readable media (e.g., tangible and non-transitory machine-readable media). The instructions 824 may be transmitted or received over the network 190 via the network interface device 820. For example, the network interface device 820 may communicate the instructions 824 using any one or more transfer protocols (e.g., hypertext transfer protocol (HTTP)).

In some example embodiments, the machine 800 may be a portable computing device, such as a smart phone or tablet computer, and have one or more additional input components 830 (e.g., sensors or gauges). Examples of such input components 830 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 822 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 824 for execution by the machine 800, such that the instructions 824, when executed by one or more processors of the machine 800 (e.g., processor 802), cause the machine 800 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:
   receiving, by one or more electronic hardware processors, a reference to an item from a first device and an indication of a location of the item;
   generating, by the one or more electronic hardware processors, an item page that refers to the item based on the received reference to the item;
   classifying a plurality of comments directed to the item as either positive or negative;
   receiving, by the one or more electronic hardware processors, from a second device, an indication of a location of the second device;
   determining the second device is within a threshold distance from the indicated location of the item; and
   sending, by the one or more electronic hardware processors, an address of the generated item page to the second device, the sending being in response to a number of comments classified as positive outnumbering a second number of comments classified as negative and the second device being within the threshold distance from the indicated location of the item.

2. The method of claim 1, wherein the sending of the address of the generated item page is configured to cause the second device to display the item page and the comments.

3. The method of claim 1, wherein the location of the second device is obtained via a GPS receiver integrated with the second device.

4. The method of claim 1, further comprising receiving, from the first device, a notification that the item has been purchased via the first device, and wherein the sending of the address of the generated item page to the second device is in response to the receiving of the notification from the first device.

5. The method of claim 1, wherein the comments include at least one of a recommendation of the item, a description of an interaction with the item, or a rating for the item.

6. The method of claim 1, wherein the receiving of the reference to the item includes receiving an image that depicts the item, and wherein the generating of the item page is based on the image that depicts the item.

7. The method of claim 1, wherein the receiving of the reference to the item includes receiving an identifier of the item, and wherein the generating of the item page is based on the identifier of the item.

8. The method of claim 1, further comprising:
   receiving item preferences from a third device;
   retrieving item characteristics of the item from a database based on the reference to the item;
   determining that the item preferences match the item characteristics; and
   sending the address of the generated item page to the third device in response to the determination that the item preferences match the item characteristics.

9. A system comprising:
   hardware processing circuitry;
   a hardware memory storing instructions that when executed cause the hardware processing circuitry to perform operations comprising:
   receiving a reference to an item from a first device and an indication of a location of the item;
   generating an item page that refers to the item based on the received reference to the item;
   classifying a plurality of comments directed to the item as either positive or negative;
   receiving from a second device, an indication of a location of the second device;
   determining the second device is within a threshold distance from the indicated location of the item; and
   sending an address of the generated item page to the second device, the sending being in response to a number of comments classified as positive outnumbering a second number of comments classified as negative and the second device being within the threshold distance from the indicated location of the item.

10. The system of claim 9, wherein the sending of the address of the generated item page is configured to cause the second device to display the item page and the comments.

11. The system of claim 9, wherein the location of the second device is obtained via a GPS receiver integrated with the second device.

12. The system of claim 9, the operations further comprising receiving, from the first device, a notification that the item has been purchased via the first device, and wherein the sending of the address of the generated item page to the second device is in response to the receiving of the notification from the first device.

13. The system of claim 9, wherein the comments include at least one of a recommendation of the item, a description of an interaction with the item, or a rating for the item.

14. The system of claim 9, wherein the receiving of the reference to the item includes receiving an image that depicts the item, and wherein the generating of the item page is based on the image that depicts the item.

15. The system of claim 9, wherein the receiving of the reference to the item includes receiving an identifier of the item, and wherein the generating of the item page is based on the identifier of the item.

16. The system of claim 9, the operations further comprising:
   receiving item preferences from a third device;
   retrieving item characteristics of the item from a database based on the reference to the item;
   determining that the item preferences match the item characteristics; and
   sending the address of the generated item page to the third device in response to the determination that the item preferences match the item characteristics.

17. A non-transitory computer readable storage medium comprising instructions that when executed cause hardware processing circuitry to perform operations comprising:

receiving a reference to an item from a first device and an indication of a location of the item;

generating an item page that refers to the item based on the received reference to the item;

classifying a plurality of comments directed to the item as either positive or negative;

receiving from a second device, an indication of a location of the second device;

determining the second device is within a threshold distance from the indicated location of the item; and sending an address of the generated item page to the second device, the sending being in response to a number of comments classified as positive outnumbering a second number of comments classified as negative and the second device being within the threshold distance from the indicated location of the item.

18. The non-transitory computer readable storage medium of claim 17, wherein the sending of the address of the generated item page is configured to cause the second device to display the item page and the comments.

19. The non-transitory computer readable storage medium of claim 17, wherein the location of the second device is obtained via a GPS receiver integrated with the second device.

20. The non-transitory computer readable storage medium of claim 17, the operations further comprising receiving, from the first device, a notification that the item has been purchased via the first device, and wherein the sending of the address of the generated item page to the second device is in response to the receiving of the notification from the first device.

* * * * *